Jan. 24, 1933.  H. E. WARREN  1,895,356
ALTERNATING CURRENT MOTOR
Filed Sept. 17, 1930  2 Sheets-Sheet 1

Inventor:
Henry E. Warren,
by Charles E. Tullar
His Attorney.

Jan. 24, 1933.    H. E. WARREN    1,895,356
ALTERNATING CURRENT MOTOR
Filed Sept. 17, 1930    2 Sheets-Sheet 2

Inventor:
Henry E. Warren,
by Charles A. Tullar
His Attorney.

Patented Jan. 24, 1933

1,895,356

UNITED STATES PATENT OFFICE

HENRY E. WARREN, OF ASHLAND, MASSACHUSETTS, ASSIGNOR TO WARREN TELECHRON COMPANY, OF ASHLAND, MASSACHUSETTS, A CORPORATION OF MAINE

ALTERNATING CURRENT MOTOR

Application filed September 17, 1930. Serial No. 482,557.

My invention relates to improvements in the structure and operating characteristics of electric motors and more particularly to miniature alternating current motors.

One object of my invention is to provide an improved field structure of the shaded pole type particularly suitable for use in small, low speed synchronous motors. By changing the character of the rotor employed with the field structure of my invention different motor characteristics may be obtained. Thus, if I use a non-salient pole rotor I may obtain a substantially constant speed but non-synchronous motor characteristic. By using a salient pole rotor, synchronous motor characteristics are obtained and such a motor may be made self-starting or non-self-starting by further modifications in the rotor as will be subsequently explained.

While I do not wish to confine my invention to a motor with a bipolar field structure, such is the preferred and simplest arrangement and the features of the invention relating to the field structure will be described as embodied in the bipolar, single phase, shaded pole type of field structure. The most important change in the field structure results in a novel flux distribution in the air gap between stator and rotor. In the ordinary arrangement the pole faces are curved forming a uniform cylindrical air gap nearly surrounding the rotor. I retain the uniform cylindrical air gap over the main central portions of the pole faces but the leading and trailing pole tips project inwardly and are brought closer to the rotor to provide limited polar salients at selected points about the rotor at which a portion of the flux is concentrated as it enters and leaves the rotor. Thus, each stator pole has a shaded and an unshaded pole salient where the flux tends to concentrate and these points are separated by relatively larger shaded and unshaded polar arcs of lesser flux density. The field produced by this arrangement may be considered as being made of two components, namely, the usual substantially circular rotating magnetic field substantially uniformly distributed about the rotor, and a pulsating magnetic field concentrated at the pole tips. The distributed rotating magnetic field component determines the direction of rotation and produces induction motor torque. The concentrated pulsating field component produces synchronous motor torque when a salient pole rotor is employed. The last mentioned field component also apparently produces a magnetic damping effect upon the rotor if the latter is designed with eddy current paths in its periphery. The induction motor torque decreases with speed, whereas the damping torque increases with the speed so that a motor of a particular design has a natural constant speed condition where the difference of these torques equals that required to drive the load consisting usually of friction. If a synchronous speed is desired it is an advantage to make the synchronous speed, determined by the number of rotor polar salients, correspond to about the constant speed characteristic of the motor.

Other novel structural and operating features particularly adapted for use with a motor of the type described will be hereinafter explained and the features which are considered novel and patentable will be pointed out in the claims appended hereto.

Figure 1:
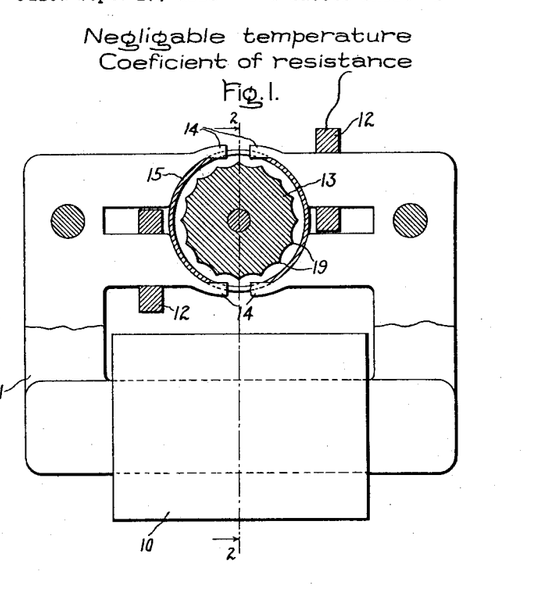
Fig. 1 shows an end view partially in section of a motor having a stator element designed in accordance with my invention and equipped with a rotor entirely of magnetic material which has shallow teeth and slots designed to have both induction motor and synchronizing torque. Such a motor is non-self-starting, i. e., its induction motor starting torque is usually not sufficient to be relied upon for self-starting purposes.

I will first describe the motor structure and then explain the principle of operation as it is at present understood. It will be noted from Figs. 1 and 2 that the stationary field structure or stator element is for the most part similar to previous single phase, bipolar, shaded pole motors. 10 indicates the single phase energizing coil or winding and 11 the magnetic field structure which is preferably laminated. The pole pieces are split into two halves and one of the halves of each pole piece is surrounded with a shading coil indicated at 12 to produce a rotating or shifting magnetic field in the air gap space between the poles and in which the rotor 13 is located. Contrary to the usual arrangement the outer extremities 14 of the pole pieces approach somewhat closer to the rotor than the intermediate portion of the pole pieces. These tips 14 partially concentrate the flux at these points as it enters and leaves the rotor and is an important feature of the present invention. This arrangement of the pole pieces and pole tips tends to give the flux crossing the rotor air gap two different characteristics. We may consider that the resultant flux is made up of two fields, one of which is a relatively weak rotating magnetic field, fairly evenly distributed about the rotor air gap, and the other of which is a pulsating field concentrated at the pole tips 14. The ring shaped part shown at 15 in Fig. 1 is a casing structure of non-magnetic material and is not intended to modify the nature of the field flux in any way. Except at the pole tips where the casing is cut away it is shaped to a size to fit tightly the inner periphery of the pole pieces and may comprise a non-magnetic cylinder of german silver, brass or bakelite held within the inner periphery of the pole pieces and provided with cut away portions or openings or depressions adjacent the pole tips 14 to allow the pole tip to approach more closely to the rotor as illustrated. The ends of this cylindrical casing are closed by end pieces 16 which contain the motor bearings 17 supporting the rotor shaft 18. The casing is so constructed and centrally held within the pole pieces as to provide the necessary support for the rotating element and its shaft. When the casing is made of a conducting material certain eddy current losses occur therein, but these losses are unimportant in a motor of this character and are more than offset by the advantage of a single mechanical casing construction sufficiently strong to comprise the entire support for the bearings.

Figure 2:
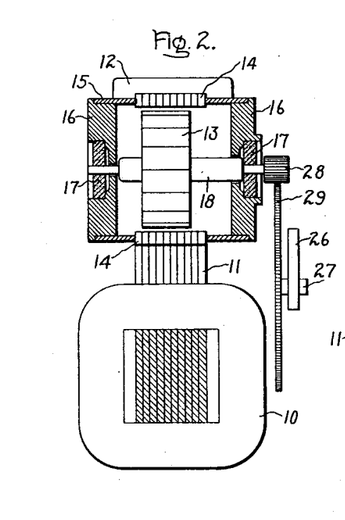
Fig. 2 is a sectional view of Fig. 1 taken on line 2—2 thereof, and illustrates a novel casing construction for supporting the rotor, which casing is firmly held within the cylindrical peripheral portions of the stator pole faces. This figure also shows how the rotor may be placed slightly to one side of the field to provide means for compensating for changes in voltage and illustrates a portion of a gear train and control device to be explained in connection with Figs. 4 and 5.
Figures 3, 4:
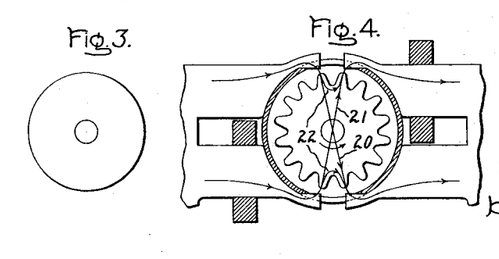
Fig. 3 is a plain cylindrical rotor capable of developing induction motor and damping torque to obtain constant speed characteristics.
Fig. 4 shows a motor with a rotor having prominent salient poles and excellent synchronizing torque but small induction motor torque.

The rotor shown in Figs. 1 and 2 is of magnetic material, preferably of solid soft steel and is provided with a plurality of shallow flutes forming a plurality of evenly spaced projections 19 serving the purpose of salient poles. Such a motor as it is at present understood is believed to have three rather definite torque characteristics, namely an induction motor torque, a damping torque and a synchronous reaction motor torque. The last mentioned torque is due to the salient poles in the rotor and if these are omitted and the rotor is made of soft iron no synchronizing torque will be present. Thus, if I replace the rotor of Fig. 1 with a plain cylindrical soft steel rotor such as is shown in Fig. 3, the relatively weak uniformly distributed rotating magnetic field component will produce an induction motor torque in the rotor in the direction of the rotating magnetic field component which is counter-clockwise in Fig. 1. This torque is a maximum at standstill and decreases with speed and approaches zero as the rotor speed approaches the speed of the rotating magnetic field. Theoretically the speed of the rotating magnetic field is 3600 R. P. M. in a two-pole, 60 cycle motor but practically it is governed by other factors mainly the degree of lagging produced by the shading coils. The induction motor torque is reduced due to bearing friction and the static friction of the bearings at start so that the effective induction motor torque is low at start, rises abruptly after the static friction is overcome, and then gradually decreases to zero at some speed generally well below 3600 R. P. M. in the motor of the present invention. The magnitude of the induction motor torque may be controlled by the rotor design as will subsequently be explained.

The damping torque is due primarily to the formation of eddy currents in the periphery of the rotor adjacent the pole tips where the concentrated flux pulsations enter and leave the rotor if the rotor periphery is of such a character as will permit the flow of such eddy currents.

In the rotor of Fig. 3 the unbroken cylindrical surface of conducting material will evidently permit the flow of considerable eddy currents at the concentrated flux pulsation points which produce a damping torque. This torque is of course zero at zero speed but increases with speed and opposes the induction motor torque. In the rotor of Fig. 1 the salient poles are too shallow to effectively prevent the flow of local eddy currents in the rotor periphery and this rotor will also have a damping torque which increases with speed. It is possible that due to the shallow salient poles this damping torque will be more pronounced at certain critical speeds than at others and at one stage of my investigation I obtained the impression that this eddy current effect, produced in a rotor periphery of the character shown in Fig. 1 by the concentrated flux pulsations, might even produce a positive torque at certain critical speeds and a negative damping torque at other speeds. I believe however that there exists a damping torque which in general increases with speed and which finally becomes equal to the decreasing effective induction motor torque at a speed somewhat below that at which the motor would ordinarily tend to run due to induction motor torque alone.

In any event I have found that such a motor having a rotor periphery of a character permitting the circulation of eddy currents such as would be induced by the concentrated flux pulsations under the pole tips tends to have a rather definite constant speed characteristic somewhat below the speed in which the same rotor would have in a bipolar shaded pole field of ordinary construction. This characteristic is not dependent upon salient poles in the rotor since I have demonstrated its existence by numerous experiments with rotors of the form shown in Fig. 3 as well as with rotors of the form shown in Fig. 1. It is due however to the form of the rotor air gap which gives the field flux the two characteristics previously explained, namely, a distributed rotating magnetic field characteristic productive of induction motor torque and a concentrated pulsating field characteristic productive of a negative damping torque, the first torque decreasing and the latter torque increasing with speed.

The speed at which a rotor of the form shown in Fig. 3 will run in this type of field is only slightly effected by voltage changes over a considerable range of voltage. This is no doubt explained by the fact that a change in voltage changes the induction motor torque and the damping torque in the same proportion. I have found however that the speed is very sensitive to changes in the resistance of the shading coils, the explanation for which I believe is that a change in the resistance of the shading coils varies the extent of flux lag between the shaded and unshaded halves of the poles and obviously changes the induction motor torque at a given speed due to the change in the distributed rotating magnetic field characteristic. However, this change does not appreciably change the character of the concentrated flux pulsations in so far as the production of damping torque is concerned. Consequently I may vary the constant speed point of such a motor by varying the resistance of the shading coils. So sensitive is the motor to such a change that I have found it desirable to employ a shading coil arrangement which is compensated for temperature changes and a simple way of doing this is to make the shading coils from a material having a negligible temperature coefficient of resistance. A material which I have employed for this purpose with satisfactory results is an alloy of copper and tin, sometimes called telephone bronze containing not more than about 1% tin and the remainder copper. Best results are obtained by using between ½% and 1% tin. This material has a temperature coefficient of resistance which is only about 40% as great as that of copper but has only about 30 to 40% the conductivity of copper and it is therefore necessary to make the shading coils correspondingly larger in cross-section. Improvement in the temperature coefficient of a shading coil so made is sufficient to take care of the difficulty referred to above under ordinary operating conditions in this type of motor.

The preceding discussion has dealt primarily with the non-synchronous characteristics of the motor and I will now take up the synchronous characteristics. If I replace the rotor of Fig. 1 with a rotor such as is shown in Fig. 4 formed of magnetic material such as iron or soft steel and having prominent salient poles, I obtain a motor having definite synchronous characteristics, very little damping torque and some induction motor torque. The damping torque is negligible because the eddy currents are suppressed in the surface due to the irregular nature thereof. The induction motor torque will be somewhat less than in the rotor of Fig. 1 because in Fig. 4 the rotor is less favorably designed from the induction motor standpoint. The rotor of Fig. 4 will have a synchronous speed in R. P. M. equal to the cycles per minute divided by half the number of rotor poles. Thus, in a 60 cycle motor, the rotor being provided with 16 rotor poles as illustrated, the synchronous speed in R. P. M. $= \dfrac{3600}{8} = 450$ This is caused by a sort of magnetic escapement action between the rotor poles and the salient pole tips of the stator where the concentrated flux pulsations occur. I have found that the rotor will rotate in synchronism with such flux pulsations at a speed where the rotor moves one pole space for each half cycle. A possible explanation of this action follows.

During the first portion of a half flux cycle the flux is largely through the unshaded pole halves so that a concentrated flux pulsation will occur through the rotor between the unshaded pole tips as indicated by line 20, Fig. 4. During a later portion of the same half flux cycle when the flux is largely through the shaded pole halves the concentrated flux pulsation will occur through the rotor between the trailing pole tips as indicated by line 21. At an intermediate portion of the same half flux cycle when the flux is distributed between both halves of the poles flux pulsations will no doubt occur between the adjacent pole tips through the adjacent rotor teeth as indicated by lines 22. The angle of flux lag is considerably less than 90 degrees, probably only about half of 90 degrees, so that it may be assumed that the main half cycle flux pulsation is divided into the three pulsations pictured in Fig. 4 and that the time between the portions represented by lines 20 and 21 corresponds to an electrical angle of approximately 45 degrees. The position of the rotor represented corresponds to its average position during this time and since it rotates one tooth per half cycle of 180 electrical degrees it moves about one-quarter of the distance between the teeth in the period described and seeks an average reluctance position to the flux pulsations described. It will be noted that owing to the length of the stator pole tips where they approach the rotor the pairs of rotor teeth adjacent thereto may move some distance without materially changing the reluctance. During the low flux portion of a cycle when the main flux is reversing in direction through the stator the rotor teeth move through the maximum reluctance position and approach a new position of least reluctance in time to synchronize with the flux pulsations of the next half cycle, thus moving one tooth's distance for each half cycle. It is possible that the above explanation is not entirely accurate or complete, but it is a fact demonstrated by numerous experiments that such a motor has a definite and satisfactory synchronous operation at a speed where the rotor moves at a speed of one pole tooth per half cycle. The 16 pole rotor will therefore have a synchronous speed of 1/8th revolution per cycle, or 450 R. P. M. on a 60 cycle circuit. Such a motor also has a locking torque at standstill. The synchronous speed less than that corresponding to the stator pole number is sometimes referred to as a subsynchronous speed.

I have found that successful synchronous operation may be obtained by various shaped rotor teeth of greater or less prominence than those illustrated and that the synchronous speed of the rotor may be varied by varying the number of evenly spaced teeth in the rotor. I have also found that the distance between the adjacent leading and trailing pole tips may vary somewhat without interfering with successful synchronous operation, the best results being obtained when this spacing is from a little less than the rotor pole spacing to nearly twice the rotor pole spacing. The spacing should be greater than the minimum spacing between stator and rotor teeth. The best spacing varies with other factors. The extent to which the flux is shaded by the shading coils determines the phase angle lag of the flux and the time relation between the occurrence of the flux pulsations at the trailing and leading pole tips. The best synchronous operation at any particular speed, frequency and motor design requires that the proper shading coils be used although some latitude in design in this respect is not fatal. After synchronism is established a considerable change in shading coil resistance may be allowed without interference. The synchronous operation is independent of ordinary changes in voltage but a motor of this character designed for a 110 volt circuit for example can not be successfully used on a 220 volt circuit unless the resistance of the shading coils is increased.

When such a motor or any synchronous modification thereof is employed on circuits having a wide fluctuation in voltage the voltage compensating means pictured in Fig. 2 may be used to advantage. This voltage compensating arrangement consists in positioning the rotor 13 slightly to off center with respect to the center line of the stator to provide an endwise magnetic pull on the rotor, and to provide a friction thrust bearing against which this magnetic pull operates. Thus the magnetic pull on the rotor toward the center of the field forces the shoulder of shaft 18 against the fiber bearing 17 and creates a friction proportional to the pull or proportional to the motor voltage. The magnitude of this friction can easily be changed by moving the rotor on the shaft until the correct amount is obtained to compensate the motor torque for changes in line voltage. Such means prevents the induction motor torque from overcoming the synchronous torque at synchronous speed upon a considerable increase in voltage such as would otherwise cause the motor to operate above synchronous speed. This device should generally be used with the motor of Figs. 1 and 2 where the salient poles and consequently the synchronous torque is relatively small as compared to the induction motor torque.

Figure 5:
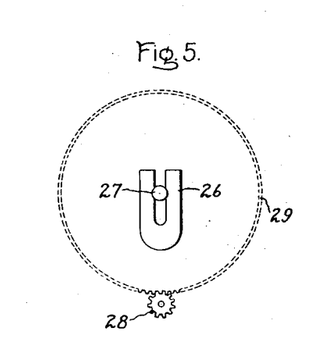
Fig. 5 is an end view of an unbalanced weight on a gear shaft driven by such a motor as is shown in Figs. 1 and 2 which may be employed for assisting the rotor, if of the non-self-starting synchronous type, to fall in step at synchronous speed after being started by hand.
Figure 6:
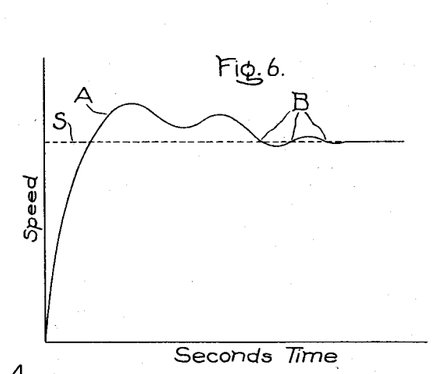
Fig. 6 is a speed time curve explanatory of the action of the unbalanced weight device of Fig. 5.

In the modifications of my invention of the non-self-starting synchronous type and in any non-self-starting synchronous motor which is required to be started by hand as by giving the rotor a spin to bring it up to or slightly above its synchronous speed the synchronizing arrangement best shown in Fig. 5 will be helpful although not always necessary. This device consists merely of an unbalanced weight 26 secured to a horizontally disposed shaft 27 driven by the motor through reduction gears 28 and 29. The weight may be secured to a portion of the gear train usually employed with such motors where the speed is somewhat lower than the motor rotor speed. The action of such an unbalanced weight is represented in the speed time curve of Fig. 6. When the rotating parts are given a spin by hand to start the motor and then released the rotating parts are accelerated above their synchronous operating speed, represented by the dotted line S, and then allowed to slow down somewhat as represented by the curve A. By providing a suitably unbalanced weight on the rotating parts as described, the slowing down cycle is not uniform but waves up and down as the weight 26 falls and rises, adding and subtracting its momentum to the momentum of the remaining rotating parts. If the parts are properly chosen the natural decelerating rate will be modified in the vicinity of synchronous speed so that the parts will pass through synchronous speed two or more times somewhat as represented at points B, greatly increasing the chance of bringing about a condition of speed, rate of change of speed, and rotor position favorable to the synchronous locking in action and I have found this simple device very effective in assisting a non-self-starting synchronous motor to lock into synchronism where otherwise several starting trials might be necessary.

Figure 7:
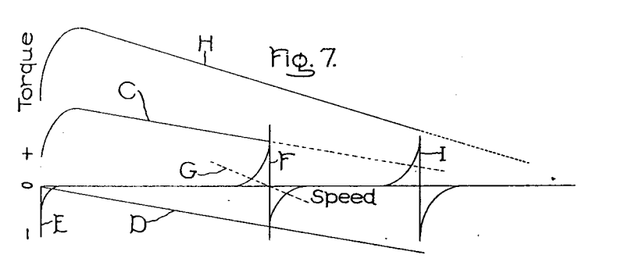
Fig. 7 shows various speed-torque curves which will be referred to in comparing the torque characteristics and operation of different forms of the invention.
Figure 8:
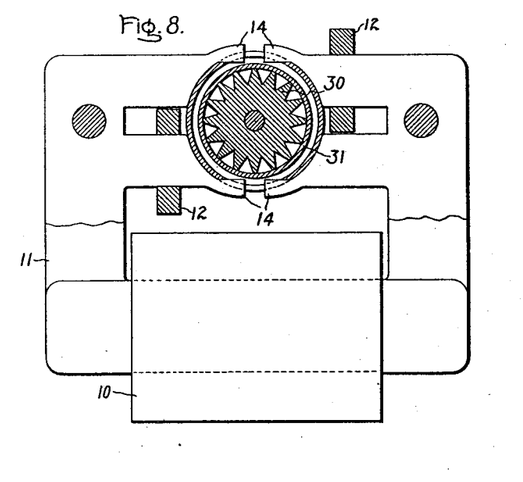
Figs. 8 and 9 are views corresponding to Figs. 1 and 2 respectively of a non-self-starting motor showing a preferred form of rotor in which the induction motor and synchronizing torques are somewhat greater than in the form of rotor shown in Fig. 1.
Figure 9:
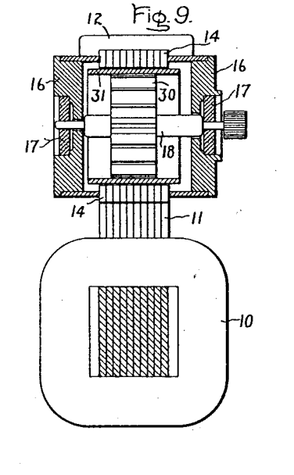

A preferred form of my invention for a non-self-starting synchronous motor is shown in Figs. 8 and 9 and utilizes induction motor torque, damping torque, and synchronous torque, so combined that the constant speed characteristics resulting from the opposing characteristics of induction motor and damping torques occurs at approximately the selected synchronous operating speed determined by the number of salient rotor poles. The motor with the exception of the rotor is similar to that shown in Figs. 1 and 2 and the general principles of motor operation hereinbefore explained are the same. The essential difference is in the structure of the rotor. In Figs. 8 and 9 the rotor comprises a magnetic salient pole core member 30 which may be of cold rolled steel upon which is pressed a non-magnetic shell of conducting material 31, such as copper. Induction motor torque is produced in both parts of the rotor. Damping torque is produced under the pole tips in the outer shell of conducting material 31. Synchronous torque is due to the salient poles of the magnetic core material 30. The effective induction motor torque, after subtracting static bearing friction and running friction, may be represented by the curve C, Fig. 7. The damping torque which is negative and in opposition to the induction motor torque may be represented by the line D. The negative locking torque at standstill may be represented by E and the synchronous torque at synchronous speed by F. The torque F is plotted both above and below the zero torque line at the synchronous speed because if an attempt is made to drive the rotor above its synchronous speed this torque becomes negative and opposes further acceleration. The curved portions of the F torque representation indicate the pull-in values close to synchronous speed which in a 60 cycle motor, with the rotor pole number represented, is 450 R. P. M.

From an inspection of the torque values referred to at zero speed it is apparent that the motor will not be self-starting. The dotted line G represents the resultant torque in the vicinity of synchronous speed obtained by subtracting the negative damping torque from the effective induction motor torque and it is seen that this resultant torque G is positive below synchronous speed, crosses the zero torque line at or close to synchronous speed, and then becomes negative above synchronous speed. It is apparent therefore that disregarding the synchronous torque F the motor will have a substantially constant speed characteristic close to the selected synchronous speed. This is helpful in assisting the locking in action at synchronous speed after starting the motor by hand because if the motor is started by hand resulting in either a lower or higher speed than the synchronous speed the resultant torque G will quickly tend to bring the motor speed within the pull-in speed range at synchronism. At synchronous speed the motor is for all practical purposes a pure synchronous motor since the other torques cancel or substantially cancel each other and are not effective. The operation as a synchronous motor is very reliable and the rotor is not easily pulled out of step.

I will now explain one way in which the torque relations may be changed so as to have the constant speed characteristic of the motor occur at a different speed selected as the synchronous speed and also how the motor may be made self starting. Suppose we desire a synchronous speed of 720 R. P. M. for a 60 cycle motor. According to the synchronous speed formula of the motor we will have 10 rotor poles. Therefore we desire to design the motor to have a constant speed characteristic at about 720 R. P. M.

Figure 10:
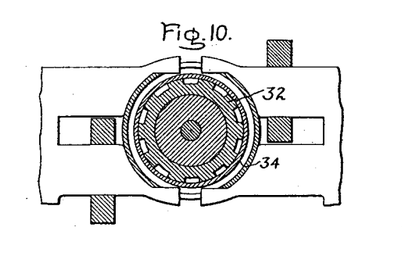
Fig. 10 is a partial sectional end view of a self-starting synchronous motor of my invention.
Figure 11:
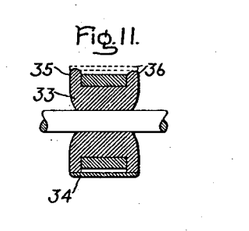
Fig. 11 is a sectional side view of the rotor for the motor of Fig. 10.
Figure 12:
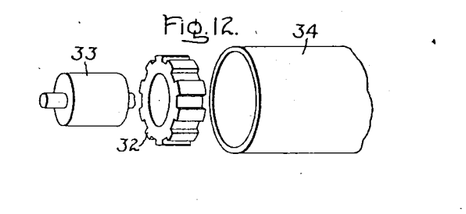
Fig. 12 shows parts of a rotor such as is shown in Figs. 10 and 11 before assembly to show more clearly a preferred way of forming such a rotor.

I have found that a 10 pole rotor such as is shown in Figs. 10 and 11 will produce the desired characteristics and make a successful 720 R. P. M. synchronous motor rotor and in addition will be self-starting. This rotor comprises a cylindrical magnetic salient pole part 32 provided with ten salient poles completely surrounded with a non-magnetic conducting material such as copper. To facilitate manufacture and make a good rotor I have found it desirable to make such a rotor of parts such as are represented in Fig. 12. A copper core part 33 somewhat longer than the desired length of the completed rotor is provided upon which the magnetic element 32 is pressed. Then the two ends of the part 33 are worked outward about the two sides of the magnetic part 32 about as represented in the upper half of Fig. 11 at 35 and 36. Next, a copper tube 34 of the correct dimensions is pressed over the parts. The outer turned up edges of the part 33 are carried to such dimensions as will make a very tight fit at both ends when the tube 34 is pressed on. Thus, if the tube 34 is pressed over edge 36 from the right, edge 35 will be of a slightly greater diameter than 36 to compensate for the expansion which the tube undergoes in being forced over edge 36 so that both edges will make a tight fit with the tube. The tube is then cut off and the corners rolled down as indicated at the lower part of Fig. 11, leaving a copper casing completely surrounding the magnetic part, which shell is strong mechanically and provides a good electrical circuit about the magnetic part. While I do not confine myself to a rotor as thus constructed I have tried out many different methods of constructing such a rotor and now believe the construction described to give the best results from the manufacturing and operation standpoints. So far as the damping torque is concerned it will be approximately the same at any given speed as in the rotor of Fig. 8 since this torque is determined by the eddy currents in the rotor periphery part 34 under the pole tips. This torque is therefore sufficiently well represented by line D in Fig. 7. The induction motor torque has been materially increased due to the copper completely surrounding the magnetic part 32. Induced currents productive of induction motor torque may now flow completely around the part 32 through a low resistance path. The effective induction motor torque may be represented by curve H, Fig. 7. Torques D and H are opposed and equal to each other at about 720 R. P. M., the synchronous speed of a 10-pole rotor. I represents the synchronous torque at such speed.

It will be seen that assuming the same value of locking the torque at zero speed as before the induction motor torque H at standstill is amply sufficient to start the motor. The magnitude of the locking and synchronous torques is dependent upon the prominence of the salient rotor poles and this may be varied considerably. This motor is both self-starting and synchronous in its operation. The motors with which I have experimented in developing the present invention are of small size; for example having rotors about the diameter of a ten cent piece. It is not easy to accurately measure all the different torque values on such small motors and the curves represented in Fig. 7 are not to be taken as representative of accurate values plotted from test data on any particular motor or motors but are merely representative of the relative torque characteristics which I have found to exist in different forms of the motor described after conducting a large number of tests.

It will be noted that within limits of design I can make the induction motor starting torque anything desired and entirely eliminate its effect at the selected synchronous speed by control of the damping torque. It is of course not essential to synchronous operation that the synchronous speed and constant speed motor characteristics should correspond. For example, if I made the core part 30 of Fig. 8 with ten poles instead of sixteen, I could obtain synchronous operation at 720 R. P. M. but the effective synchronous torque would be materially reduced due to the preponderance of negative damping torque over the induction motor torque and considerably greater care would be required in getting the rotor into step upon being started. The motor of my invention equipped with the synchronous type of rotor will not operate synchronously in a reverse direction because then both the induction motor and damping torque would oppose rotation, the former rising to very high values. This is an advantage in a non-self-starting motor for driving time pieces because in the form of non-self-starting synchronous motor driven clock described in United States Patent 1,719,805 July 2, 1929, Hammond for example, the motor will operate equally well in either direction of rotation and if started in the wrong direction will operate the clock backward instead of forward.

It appears that certain aspects of my invention such as the voltage compensating braking means and the rotor casing are applicable to electric motors generally. The novel features of the stator construction appear to be applicable to shaded pole alternating current motors generally but particularly useful in connection with synchronous motors, whether self-starting or otherwise. The control and utilization of the damping torque appears generally applicable to alternating current motors but particularly useful in obtaining constant speed characteristics in such motors. Other novel aspects of my invention are believed to be of more or less general application in connection with self-starting or non-self-starting synchronous motors, or both.

In accordance with the provisions of the patent statutes I have described the principles of operation of my invention as they are now understood, together with a few embodiments of the invention which I now consider to best illustrate the applications of such principles to practical use, but I desire to have it understood that the particular apparatus shown and described is only illustrative and that the invention may be carried out by other means.

What I claim as new and desire to secure by Letters Patent of the United States, is:

1. A stator for alternating current motors comprising a field magnet having salient pole pieces, an energizing winding for such magnet, shading coils on portions of said pole pieces whereby a distributed, rotating magnetic field component is produced between such pole pieces, and magnetic extensions on the shaded and unshaded portions of said pole pieces for producing concentrated pulsating flux components between the extensions on shaded and unshaded portions of different pole pieces.

2. A stator for alternating current motors comprising a field magnet having salient pole pieces, an energizing winding for said magnet, shading coils on the trailing portions of said pole pieces for producing a distributed rotating magnetic field component between said pole pieces, and inwardly projecting magnetic extensions on the trailing and leading pole tips for producing concentrated pulsating flux components between the extensions on different pole pieces.

3. A stator element for alternating current motors comprising a bipolar field magnet having a single phase energizing winding, shading coils on the trailing portions of the pole pieces for producing a distributed rotating magnetic field component between the pole pieces and inwardly projecting magnetic extensions on the leading and trailing pole tips for producing concentrated pulsating flux components between the extensions on different pole pieces.

4. An alternating current motor comprising a rotor element, a salient pole stator element for producing flux through said rotor element, the pole faces of said stator element being shaped and dimensioned for giving such flux two distinctive components, one a distributed rotating magnetic field component and the other a pulsating field component concentrated at the leading and trailing pole tips of the stator element.

5. An alternating current motor stator element comprising a magnetic structure provided with salient poles and a single phase energizing winding thereon, and shading coils on the pole pieces composed of an alloy of copper and tin, the tin component comprising between ½ and 1% of the alloy.

6. A synchronous motor comprising a single phase shaded pole stator element and a rotor element having magnetic material shaped to give the rotor salient pole effects, and shading coils on the stator element having a temperature coefficient of resistance materially less than that of copper.

7. An alternating current motor comprising cooperating stator and rotor elements, the field element having means thereon for producing a flux through the rotor having a distributed, rotating field component and concentrated pulsating flux components confined to limited portions of the air gap space between stator and rotor, the rotor element having means thereon for developing induction motor torque due to the action of the rotating magnetic field component and a damping torque due to the pulsating field component, the first mentioned torque decreasing with speed and the last mentioned torque increasing with speed, said two torques being proportioned to give the motor constant speed characteristics.

8. An alternating current motor having cooperating stator and rotor elements, the stator element having shaded salient poles with pole tips extended more closely to the rotor than the remainder of the pole pieces, an energizing winding for the stator, the rotor element having means thereon effective as an induction motor secondary with a continuous peripheral portion of conducting material, said motor having an induction motor torque and a damping torque which becomes equal to the effective induction motor torque at a speed where considerable induction torque exists.

9. An alternating current motor comprising cooperating stator and rotor elements, the stator element having means for producing a flux through the rotor having a distributed rotating magnetic field component and a pulsating flux component concentrated at limited portions of the air gap space between stator and rotor, the rotor element being designed to produce induction motor torque due to the rotating magnetic field component and having a peripheral conducting portion in which eddy current damping torque is developed due to the pulsating field component for controlling the speed of the motor.

10. A synchronous alternating current motor comprising cooperating stator and rotor elements, means on the stator element for producing a distributed rotating magnetic field component and a concentrated pulsating field component, conducting means on the rotor element influenced by the rotating field component for producing induction motor torque and with the pulsating field component for producing a damping torque, and salient pole magnetic means on the rotor influenced by the pulsating field component for producing synchronous torque at a particular speed, the effective induction motor torque and the damping torque components being approximately equal at the speed where the synchronous torque is developed.

11. An alternating current motor comprising cooperating stator and rotor elements, the stator element having means for producing a field through the rotor having a distributed rotating magnetic field component and a pulsating field component concentrated at limited portions of the air gap space between stator and rotor, the rotor having means for developing an induction motor torque due to the rotating magnetic field component, a damping torque and a synchronous torque due to the concentrated pulsating field component, the synchronous torque being developed at a particular speed, the induction motor and damping torques being proportioned to give the motor constant speed characteristics at approximately the particular speed where the synchronous torque is developed.

12. An alternating current motor comprising cooperating stator and rotor elements, the stator element having a single phase energizing winding and shaded salient poles with pole tips extending more closely to the rotor than the remainder of the pole pieces so as to produce a flux through the rotor having a distributed rotating field component and a pulsating field component concentrated at the pole tips, the rotor element having means influenced by the rotating field component for producing induction motor action, and means influenced by the pulsating flux component for producing a damping torque at different speeds, and salient magnetic poles influenced by the pulsating flux component for producing synchronous action at a definite speed, the induction motor and damping torques being proportioned to give the motor a constant speed characteristic at approximately said definite speed.

13. An alternating current motor comprising cooperating stator and rotor elements, means on the stator element for producing a distributed rotating magnetic field component and a concentrated pulsating field component, conducting means on the rotor element influenced by the rotating field component for producing induction motor torque and with the pulsating field component for producing a damping torque, and salient pole magnetic means on the rotor influenced by the pulsating field component for producing a synchronous torque at a predetermined speed, the induction motor torque predominating over the damping torque below, and the damping torque predominating over the effective induction motor torque above approximately said predetermined speed.

14. An alternating current motor comprising cooperating stator and rotor elements, means on the stator element for producing a distributed rotating magnetic field component and concentrated pulsating field component, conducting means on the rotor element influenced by the rotating field component for producing induction motor torque and with the pulsating field component for producing a damping torque, and salient pole magnetic means on the rotor influenced by the pulsating field component for producing a synchronous torque at a predetermined speed, the induction motor torque predominating over any locking torque at standstill, and over the damping torque below approximately said predetermined speed, and the damping torque predominating over the effective induction motor torque above approximately said predetermined speed.

15. An alternating current motor comprising cooperating stator and rotor elements, the stator element having a single phase energizing winding and shaded salient poles with pole tips extending more closely to the rotor than the remainder of the pole piece so as to produce a flux through the rotor element having a distributed rotating component and a pulsating component concentrated at the pole tips, the rotor being made of magnetic and non-magnetic conducting parts, the non-magnetic part serving primarily for cooperation with the distributed rotating magnetic field component to produce induction motor action and with the pulsating flux component to produce damping torque, the magnetic part having salient magnetic poles serving primarily for cooperation with the pulsating flux component to produce synchronous torque at a predetermined speed, the induction motor torque predominating over any locking action produced by the salient poles at standstill whereby the motor is self-starting, and over the damping torque below approximately said predetermined speed, and the damping torque predominating over the effective induction motor torque above approximately said predetermined speed whereby the motor has a constant speed characteristic at approximately said predetermined speed independent of the synchronous torque.

16. A synchronous motor comprising cooperating stator and rotor elements, the stator element having an alternating current energizing winding and shaded salient poles and pole tips approaching more closely to the rotor than the remaining portion of the salient poles whereby concentrated flux pulsations are produced at such pole tips varying in direction and time relation dependent upon the alternating current frequency and the extent to which the flux is lagged by the shaded poles, the rotor having salient magnetic poles cooperating with the concentrated flux pulsations to produce synchronous operation at a predetermined speed determined by the number of the salient rotor poles.

17. A synchronous motor comprising cooperating stator and rotor elements, the stator element comprising a single phase, bipolar, shaded pole magnet having leading and trailing pole tips approaching more closely to the rotor than the remainder of the pole pieces and productive of concentrated flux pulsations through the rotor between the pole tips of different poles, the rotor having salient magnetic poles, the distance between adjacent leading and trailing pole tips of the stator being not materially less than the spacing between rotor poles or greater than twice such spacing.

18. A synchronous motor comprising a rotor element having salient magnetic poles and a stator element cooperating therewith comprising an alternating current single phase, bipolar, shaded pole field element having leading and trailing pole tips approaching more closely to the rotor than the remainder of the stator poles, the distance between adjacent pole tips on different stator poles being less than twice the rotor pole spacing and more than the minimum distance between rotor and stator pole tips, said motor having a magnetic escapement action productive of a synchronous torque at a speed where the rotor moves a distance corresponding to its pole spacing each half cycle.

19. A synchronous alternating current motor comprising a rotor element provided with salient magnetic poles and a single phase, bipolar, shaded pole field element for producing a flux through said rotor, the stator pole faces being curved forming a uniform cylindrical air gap between the rotor and stator over said pole faces except at the pole tips which are extended more closely to the rotor than the remaining portion of the pole faces, the distance between adjacent pole tips on different poles being not greater than twice the spacing between rotor poles or less than the minimum distance between stator and rotor magnetic poles, said motor having an induction motor torque in the direction in which the flux is lagged by the shading coils which determines the direction of rotation, and a predominating synchronous motor torque only in said direction of rotation at a speed in R. P. M. equal to the cycles per minute divided by half the number of rotor poles.

20. A rotor for a self starting synchronous motor comprising a hollow cylindrical magnetic element having a plurality of evenly spaced teeth cut in its outer periphery forming salient magnetic poles, said magnetic element being completely incased in non-magnetic conducting material.

21. A rotor for a self-starting synchronous motor comprising a hollow cylindrical magnetic element having a plurality of evenly spaced teeth cut in its outer periphery forming salient magnetic poles, a casing of non-magnetic conducting material completely encasing said magnetic element, the outer peripheral wall of said non-magnetic casing being appreciably thinner than the remaining walls thereof.

22. The method of forming rotor of self-starting synchronous motors comprising a salient pole magnetic element completely encased in non-magnetic material, which consists in forming a central cylindrical member of conducting material longer than the length of the rotor desired, fitting a shorter magnetic gear wheel centrally thereon, working the material at the ends of the non-magnetic cylinder outward about the ends of the gear wheel to approximately the outer dimensions thereof, and tightly forcing a tube of non-magnetic conducting material conforming to the length of the desired rotor over said gear wheel and the outer peripheral portions of said worked out conducting material.

23. A combined stator and rotor casing structure for electric motors comprising a cylindrical housing of non-magnetic material with end walls containing centrally alined bearings for supporting a rotor within said housing, a stator element having field poles with curved pole faces tightly fitting the outer periphery and supporting said cylindrical housing and having pole tips fitting into recesses in the wall of said cylindrical housing.

24. In combination with a non-self-starting synchronous motor, means for assisting the motor to fall into synchronism after being started comprising a substantially horizontal shaft normally driven by the motor at a slower speed than the synchronous speed of the motor, and an unbalanced weight mounted on and rotated by said shaft.

25. In combination with a non-self-starting synchronous motor having a rotor and rotating parts connected therewith, means for assisting the establishment of synchronous operation after the motor is started comprising an unbalanced weight means rotated with the motor rotor but at a slower speed in such a manner that said weight alternately tends to accelerate and decelerate the rotating parts to vary the natural deceleration rate thereof in the vicinity of synchronous speed.

In witness whereof, I have hereunto set my hand this 15th day of Sept., 1930.

HENRY E. WARREN.